United States Patent [19]

Shutts

[11] 4,317,250
[45] Mar. 2, 1982

[54] SNOW REMOVING DEVICE

[76] Inventor: Carl V. Shutts, P.O. Box 455, Valparaiso, Ind. 46383

[21] Appl. No.: 82,332

[22] Filed: Oct. 5, 1979

[51] Int. Cl.³ .......................... A47L 25/00; B60S 3/04
[52] U.S. Cl. ..................................... 15/244 R; 15/245
[58] Field of Search ............ 15/220 R, 244 R, 244 A, 15/244 B, 244 C, 245

[56] References Cited

U.S. PATENT DOCUMENTS

| | | | |
|---|---|---|---|
| 1,750,845 | 3/1930 | Lach | 15/245 |
| 2,639,454 | 5/1953 | Dory | 15/245 |
| 2,728,099 | 12/1955 | Cocco | 15/245 |
| 2,880,443 | 4/1959 | Le Febvre | 15/244 R |
| 3,274,635 | 9/1966 | Myers | 15/244 A |
| 3,649,987 | 3/1972 | Tomingas et al. | 15/245 |
| 3,717,898 | 2/1973 | Jones | 15/245 |
| 4,103,383 | 8/1978 | Martin | 15/245 |

Primary Examiner—Edward L. Roberts
Attorney, Agent, or Firm—Schwartz, Jeffery, Schwaab, Mack, Blumenthal & Koch

[57] ABSTRACT

A snow removing device is disclosed which is particularly intended for use in the manual removal of snow from the exteriors of motor vehicles. The device includes a head having an internal core surrounding by a sheath. The sheath is constructed of an expanded, cellular, polyethylene foam material, and the core is of a different material. An elongated handle extends from the head, and the handle is affixed to the core. The overall head provides a large snow removal area in a lightweight device which will not scratch or mar an automotive finish. The cellular, polyethylene sheath constitutes a relatively large portion of the overall head.

12 Claims, 3 Drawing Figures

SNOW REMOVING DEVICE

TECHNICAL FIELD OF THE INVENTION

The present invention relates to the field of manual snow removing devices, and in particular relates to hand-held snow removing devices for removing snow from motor vehicles or the like.

DESCRIPTION OF THE PRIOR ART

Snow removing devices for motor vehicles and the like have long been known.

A typical snow removing device in common use includes a squeegee and/or ice scraper at one end with a brush at the other end. The brush is intended for removing snow from the body of a motor vehicle, but the use of the brush to accomplish this will often scratch the finish of the automobile. Also, the brush is not particularly efficient for removing deep snow, and becomes especially difficult to use where the snow is heavy, wet and sticky.

Often, a squeegee-type tool is used for removing snow from an automobile body, but the use of such a tool is very time-consuming and inefficient. The squeegee will usually have relatively small surface areas for pushing or pulling snow, so that only a small amount of snow can be removed during each pushing or pulling stroke. Because the tool is not intended for that purpose, simply increasing the size would not provide a satisfactory device.

Other types of devices for pushing or pulling snow, particularly from the bodies or automotive vehicles, have been proposed. Examples of such devices are found in U.S. Pat. Nos. 2,693,454 and 4,103,383. Among the drawbacks of such devices are that the size of the portions including snow pushing or pulling areas can be made large and thus efficient only at the expense of considerable weight and unwieldiness. Also, the devices which have been proposed do not always provide adequate protection for the finish of the motor vehicle and do not always provide for softness and flexibility of the portions which may engage the finish of the motor vehicle at low temperatures. Also, such devices have generally not found widespread public acceptance.

SUMMARY

It is an object of the present invention to overcome the drawbacks of prior art snow removing devices for motor vehicles and to provide a more practical, useful and convenient device than heretofore known.

It is a further object of the invention to provide an automotive snow removing device which provides complete protection against scratching or marring of the finish of the motor vehicle even at very low temperatures.

It is also an object of the invention to provide a snow removing device having a relatively large surface area for the removal of snow and yet which is very light in weight and easy to handle.

It is a further object of the invention to provide a manual snow removing device for an automobile which combines the features of a very lightweight snow removing head for pushing or pulling snow with the feature of a very strong and solid construction for the attachment and affixing of a long handle.

These and other objects and advantages will be apparent from the description which follows and from the drawing. To achieve the objects of the invention a manual snow removing device is provided including a head with a core in the head and a sheath surrounding and completely encapsulating the core. The sheath is constructed of an expanded, cellular polyethylene foam material, and the core is of a different material from that of the sheath. An elongated handle extends from the head. The handle is affixed to the core.

The cellular polyethylene material of the sheath is very light in weight and very resistant to absorption of water. This provides for a softness and flexibility of the device at all temperatures to avoid marring of the automobile finish and contributes to the very light weight of the head in comparison with its large snow removal area. The cellular polyethylene foam sheath comprises by far the major portion of the head, and this also contributes to these advantages and further enhances the protection against scratching or marring of the automobile finish. The core, on the other hand provides a firm, secure and solid base or anchor for a long handle.

DETAILED DESCRIPTION OF THE PREFERRED EMBODIMENT

Figure 1:
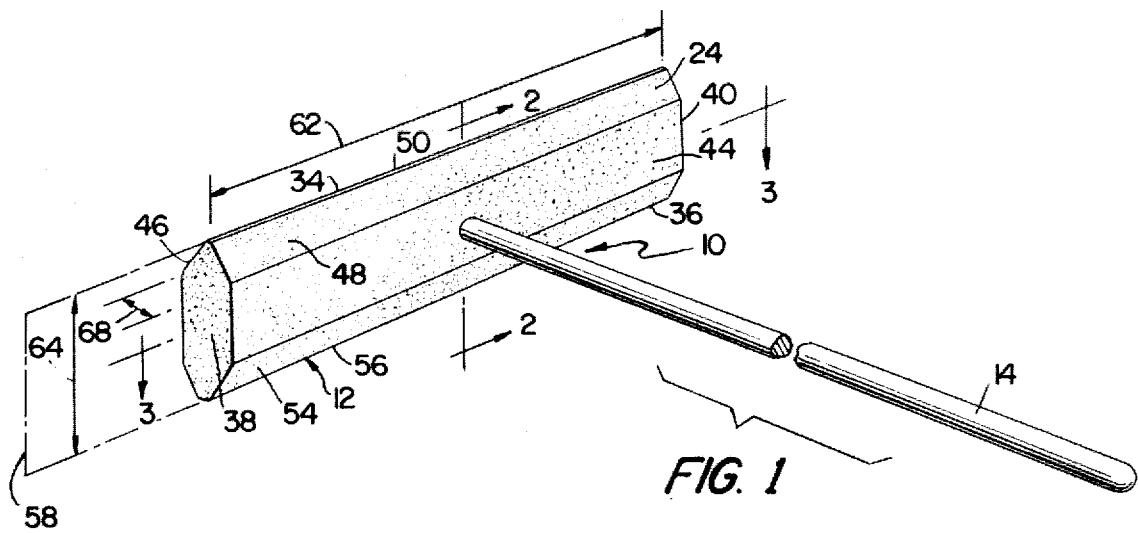
FIG. 1 is a perspective view showing the preferred embodiment of the present invention and showing the handle thereof in fragmentary form.

In the following description, and in the drawing, like reference characters used among the various figures of the drawing designate like elements or features.

Figure 2:
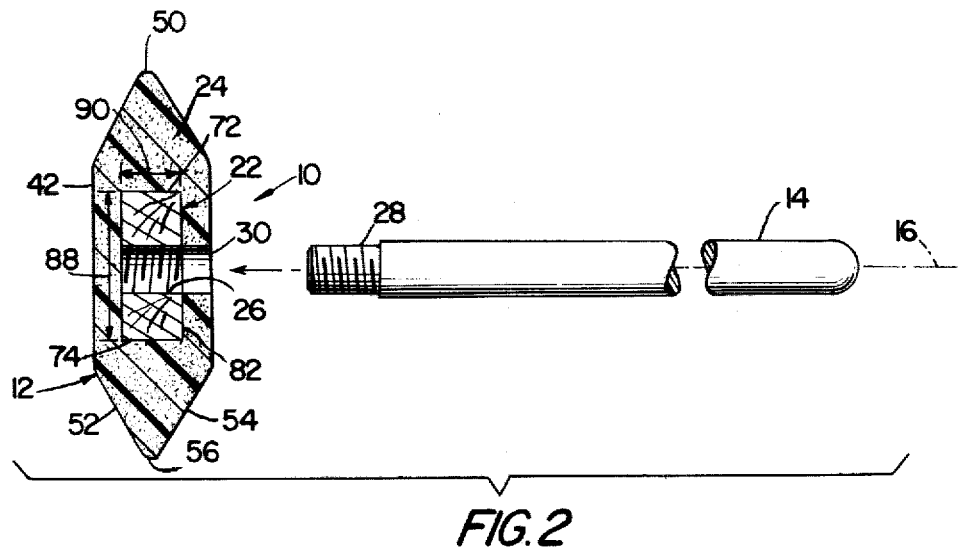
FIG. 2 is a sectional view taken on the line 2—2 of FIG. 1 and showing the handle in exploded, fragmentary form and showing the handle removed in exploded, fragmentary form.

Referring to the drawing, reference numeral 10 is used to generally refer to the preferred embodiment of the device of the present invention for removing snow from automobile bodies or the like. Snow removing device 10 includes an elongated head 12 generally referred to by reference character 12 and an elongated handle 14 extending perpendicularly outwardly from head 12. Handle 14 has a longitudinal axis 16 (FIG. 2).

Figure 3:
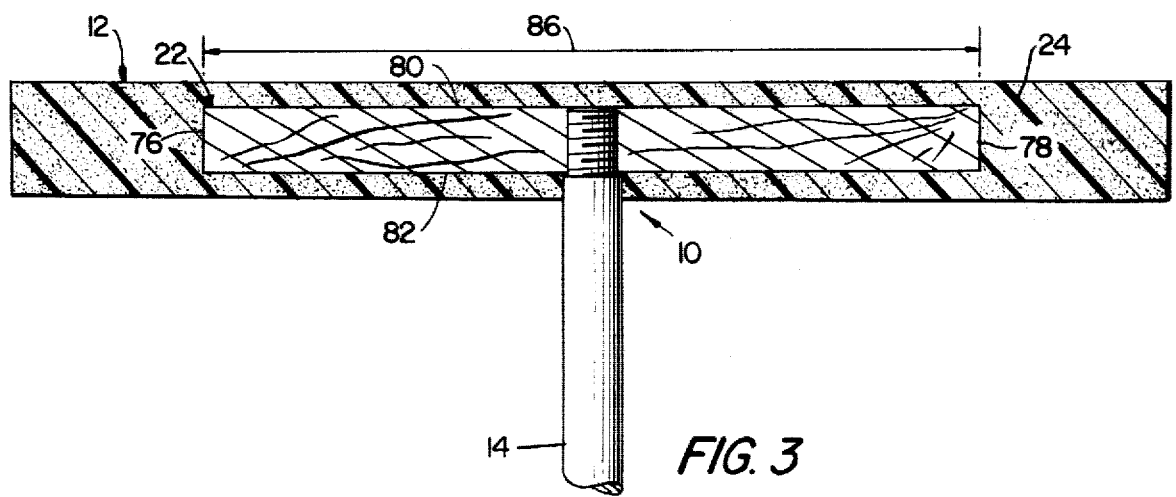
FIG. 3 is a fragmentary, cross-sectional view taken on the line 3—3 of FIG. 1.

Head 12 of device 10 includes an inner, central core 22 having a block-like configuration and being constructed of wood. Surrounding and completely enveloping and encapsulating core 22 is a sheath 24. As will be apparent from FIGS. 2 and 3, sheath 24 is relatively large in size as compared with core 22, and in particular sheath 24 will preferably be of such size and configuration that its volume is substantially larger than the volume of core 22. In the preferred embodiment, the volume of core 22 is approximately 30 cubic inches, and the volume of the sheath 24 is approximately 228 cubic inches. In other words, the volume of the sheath (excluding the interior area within the sheath which is taken up by the core) is approximately 7.6 times the volume of the core. To achieve the desirable characteristics of the device of the present invention, the ratio of the core volume to the sheath volume should be such that the sheath volume is between four times and ten times the volume of the core.

Sheath 24 is constructed of a lightweight resilient material which is different from the material of core 22. In particular, the sheath is constructed of an expanded, cellular, polyethylene foam material; specifically, a closed cell, cross-linked polyethylene foam having cells of a smaller size than the most prevalently used polyethylene foam. This type of material is known in the trade as "mini-cell" polyethylene foam material. Such material is extremely resistant to absorption of water. This is especially advantageous in the present device wherein a relatively very large area is provided for pushing, pulling or otherwise removing snow from an automobile surface. When a large working area is provided, as here, it is important that the device be of a very lightweight construction and that the material does not become heavier in use by taking on water. The particular type of material used for sheath 24 provides these advantages.

The "mini-cell" polyethylene foam used for sheath 24 also has significant advantages in terms of resiliency and ability to glide over an automobile finish without marring or scratching the same. The polyethylene foam material used for sheath 24 remains soft and resilient even in sub-zero temperatures, and its ability to resist absorption of water contributes to this low temperature resiliency. It will be apparent that this low temperature resiliency contributes significantly to the usefulness of the device of the present invention by ensuring that only a soft, resilient material comes into contact with the automobile finish during removal of snow even under extremely low temperature conditions. Were the material to become hard, rigid or partially frozen in low temperature conditions, it would then mar or scratch the automobile finish when used under such conditions. The use of a polyethylene foam material for the sheath 24 prevents this.

The polyethylene foam material of sheath 24 will preferably have a thin, outer polyethylene skin on the surfaces facing the exterior of the device 10. This skin aids in preventing absoprtion of water into the cellular foam material. It is to be understood, however, that the closed cell polyethylene foam material used for sheath 24 is inherently resistant to absorption of water irrespective of the outer skin.

The formation of sheath 24 so that it is in surrounding relationship with core 22 is to be performed by a known molding technique using blocks or slabs or unfinished, expanded polyethylene foam material. The wood core is positioned within a mold as are the slabs or blocks of polyethylene foam material. The polyethylene foam material is subjected to heat and molded into the shape shown in the drawing. Upon completion, the sheath 24 of polyethylene foam material will have an essentially one piece construction. Of course, as is apparent from the drawing, the wooden core 22 is also of one piece.

In a prototype of the present invention the sheath 24 was formed by joining together several blocks or strips of polyethylene foam material through use of adhesives. The resulting prototype had general, overall dimensions similar to those of the preferred embodiment disclosed herein but had a slightly different shape. In particular the prototype did not include tapered edges as shown in the drawing and as will be described hereinafter. Rather, the long sides which will engage the automobile surface, while being reduced in size from the central part of the sheath, had a squared-off, rectangular configuration rather than a tapering configuration.

Handle 14 is detachably secured to wooden core 22 by mating screw threads on the core and handle. In particular, core 22 includes a female threaded bore or socket 26 and handle 14 includes a mating male threaded end 28. Note from FIG. 2 that polyethylene foam sheath 24 includes a hole 30 therein through which handle 14 may extend into mating engagement with wooden core 22. Preferably, handle 14 is also constructed of wood. It is apparent from the drawing that handle 14 extends through the one side of the sheath 24, which defines the rear side of the head 12. It will be appreciated that core 22 provides a rigid base or anchor which allows solid and secure attachment of handle 14 to head 12 and which still permits the use of a soft, resilient sheath 24 in head 12.

A strong, rigid and solid core 22 as provided by the present invention contributes to the ability to use both a comparatively large head 12 and a comparatively long handle 14. Both the large head 12 and long handle 14 facilitate snow removal by allowing for a longer reach and movement of larger amounts of snow per stroke. Handle 14 is preferably approximately four feet in length. For optimum results, the handle should fall within the range of two feet-five feet in length.

Head 12 of device 10 includes a pair of upper and lower long sides 34, 36 (FIG. 1). Of course, these sides may be reversed, and either side 34 or 36 may engage the surface of an automobile and provide a large snow removing portion. Head 12 also includes a pair of oppositely disposed short sides 38, 40 (FIG. 1) which extend between sides 34, 36. It will be apparent that these sides may also be used to remove snow from small areas or tight spaces, i.e., each short side may be regarded as providing a small snow removing portion. Head 12 also includes a front side 42 (FIG. 2) and a rear side 44 (FIG. 1). An upper front tapered side 46 extends between front side 42 and upper, long side 34. An upper, rear tapered side 48 extends between rear side 44 and upper, long side 34. These tapered sides 46, 48 converge at the upper, long side 34 to form a top edge 50. As will be best seen from FIG. 2, top edge 50 has a somewhat blunt configuration rather than being a sharp edge or corner.

In a similar manner, a lower, front tapered side 52 extends between front side 42 and lower, long side 36. A lower rear tapered side 54 extends between rear side 44 and lower, long side 36. These tapered sides 52, 54 converge to form a bottom edge 56 a long lower long side 36. As with edge 50, bottom edge 56 has a blunt configuration.

The tapering of sides 46, 48 to form edge 50 and the tapering of sides 52, 54 to form edge 56 results in a construction wherein only a relatively small area of head 12 will engage the automobile finish during snow removal. In particular, only the blunt edges 50, 56 will engage the finish. This reduces friction for ease of use and helps further insure against scratching or marring of the automobile finish during use.

It will be apparent from the foregoing and from the drawing that sides 34, 36, 38, 40, 42, 44, 46, 48, 52 and 54 are all part of polyethylene foam sheath 24. If a cross-section is taken of head 12 in a plane perpendicular to handle 14, for example if a cross-section is taken in plane 58 of FIG. 1, such cross-section will generally have the shape of a rectangle with an outer, long side running parallel to long sides 34, 36 and an outer short side running parallel to short sides 36, 38.

As mentioned earlier, the head 12 of device 10, while being light in weight, is relatively very large in size. The very light weight of the polyethylene foam material of sheath 24 facilitates this. Also, there is no sacrifice in strength even with the use of a lightweight polyethylene foam material, and this is attributable, in part, to the use of a solid wood core which is relatively small in comparison with the sheath. The dimensions and size relationships of the head, including the size relationships of the sheath 24 and core 22 will now be described.

Head 12 has an outer length dimension 62 which is taken in a direction along long side 34 and thus also along the aforementioned long side of the rectangular cross-section taken in plane 58. In the preferred embodiment, outer length dimension 62 is approximately 19 inches. A length dimension on this order of magnitude has been found optimal for fast removal of substantial amounts of snow from the automobile without undue weight or resistance. In this regard, a maximum length for dimension 62 is approximately 30 inches, since above that the device then becomes too unwieldy and the resistance too great. It will be appreciated that in order to take advantage of the special construction of the snow removal device 10 as disclosed herein, the outer length dimension 62 should be at least larger than the typical squeegee-type device sold for removing fog or frost from automobile windshields and often used to less than good advantage for removing snow. In this regard, a minimum length for realizing the special advantages of the present invention is approximately 12 inches. In other words, outer length dimension 62 will fall within the range of 12 inches to 30 inches.

For essentially the same reasons discussed in connection with outer length dimension 62, other dimensions of head 12 will have a range in which the benefits of the present invention will be realized to an optimal extent. The limits of these ranges are such that the dimensions should, at a minimum, be larger than those of the typical, most commonly used type squeegee or ice scraper devices employed by motorists, and yet not so large that the device becomes unwieldy or that excessive resistance to pushing, pulling or otherwise removing snow from the car becomes too great. With this in mind, head 12 has an outer height dimension 64 taken in a direction along short sides 38, 40, and thus also along the short sides of the aforementioned rectangle defined by a cross-section through head 12 taken in plane 58. This outer height dimension 64 will fall in the range of 3 to 12 inches. In the preferred embodiment of the invention, outer height dimension 64 is approximately 6 inches.

With the same considerations in mind, head 12 has an outer thickness dimension 68 taken in a direction parallel to axis 16 of handle 14. Thickness dimension 68 is in the range of $1\frac{1}{2}$ to $2\frac{1}{2}$ inches. In the preferred embodiment, this thickness dimension is approximately 2 inches. It will be apparent that the polyethylene foam sheath 24 defines outer length dimension 62, outer height dimension 64 and outer thickness dimension 68 of head 12.

As discussed earlier, the fact that wooden core 22 is large enough to provide a solid anchor or base for handle 14 and yet is relatively small in comparison with sheath 24, contributes to the advantageous results achieved by the present invention. Core 22 must be small enough so that the overall head 12 remains light in weight and easy to handle despite its relatively large size. It also must be small enough as to not detract from the softness and flexibility of the surrounding sheath 24. Nevertheless, core 22 must be large enough to provide a solid and firm anchor for handle 14. With these considerations in mind, it will be appreciated that there will be a range of optimal dimensions for core 22 and a range of optimal ratios between the size of the core and the size of the sheath. The ranges and ratios now to be discussed have been determined based on the foregoing considerations.

Core 22 has upper and lower long sides 72, 74 (FIG. 2) parallel to upper and lower long sides 34, 36 defined by sheath 24. Similarly, core 22 has a pair of oppositely disposed lateral short sides 76, 78 (FIG. 3) parallel to short sides 38, 40, defined by sheath 24. Finally, core 22 has a front side 80 and rear side 82 parallel to front and rear sides 42, 44 defined by sheath 24.

Core 22 has an inner length dimension 86 (FIG. 3) taken in a direction parallel to outer length dimension 62 defined by sheath 24. It will be apparent that inner length dimension 86 is the same as the length of upper, long side 72 and the same as the length of lower, long side 74 of core 22. To achieve optimal results, outer length dimension 62 will be in the range of 1.25 to 2 times the inner length dimension 86 of core 22. In the preferred embodiment of the present invention outer length dimension 62 will be approximately 1.6 times inner length dimension 86, and inner length dimension 86 will be approximately 12 inches.

Core 22 has an inner height dimension 88 taken in a direction parallel to outer height dimension 64 defined by sheath 24. It will be seen that inner height dimension 88 corresponds to the length of short side 76 of core 22 and also corresponds to the length of short side 78 of core 22. To achieve optimal results, outer height dimension 64 defined by sheath 24 will be between 1.5 and 3.5 times the inner height dimension 88 of core 22. In the preferred embodiment, outer height dimension 64 is approximately 2.4 times inner height dimension 88. In particular, inner height dimension 88 is approximately 2.5 inches as compared with the outer height dimension of approximately 6 inches.

Core 22 has an inner thickness dimension taken in a direction generally parallel to outer thickness dimension 68 defined by sheath 24 of head 12. It will be seen that inner thickness dimension 90 constitutes the thickness or the width (as distinguished from the length) of each of inner long sides 72 and 74 of the wood block defining core 22. To achieve optimal results, outer thickness dimension 68 defined by sheath 24 will be between 1.5 and 2.5 times inner thickness dimension 90 defined by core 22. In the preferred embodiment of the invention, outer thickness dimension 68 is approximately 2 times inner thickness dimension 90. In particular, outer thickness dimension 68 is approximately 2 inches and inner thickness dimension 90 of core 22 is approximately 1 inch.

It will be appreciated that with the foregoing construction a large snow removal head area is provided in a lightweight and strong device which will not scratch or mar an automobile finish. It will also be appreciated that these advantages stem in part from the fact that the cellular polyethylene sheath constitutes a relatively large portion, i.e. the major portion, of head 12.

Although the present invention has been described in connection with a certain preferred embodiment, many modifications, variations and additional embodiments are possible without departing from the spirit and scope of the invention. For instance, core 22 might be constructed of a relatively rigid plastic material rather than wood.

What is claimed is:

1. A snow removing device comprising:
    an elongated head having a front side and a rear side;
    said head having a length and a height, the height extending transverse to the length, said head having a large snow removing portion extending in the direction of its length and a small snow removing portion extending in the direction of its height;

said head including a rigid core and a resilient sheath surrounding and completely encapsulating said core, said core having a block-like configuration, said sheath having front and rear sides which define the front and rear sides, respectively, of said head, said head having an outer thickness dimension extending in perpendicular relationship to said length and height of said head and in the general direction which said handle extends, said core including an inner thickness dimension extending in the same direction as said outer thickness dimension of said head, said outer thickness dimension being between 1.5 and 2.5 times said inner thickness dimension, so that said inner thickness of said core constitutes a substantial portion of said outer thickness of said head;

said sheath being constructed of an expanded, cellular polyethylene foam material, said core being of a material different from that of said sheath;

an elongated handle extending from said head;

said core including means for attaching said handle thereto, said handle being directly attached to said core by said attaching means, said handle being attached to said core only by said direct attachment to said core;

said handle extending from said core through one side of said sheath;

said attaching means including a threaded socket in said core and a threaded end on said handle, said threaded end cooperatively engaging said threaded socket, said threaded socket having a depth which constitutes at least a substantial portion of said inner thickness of said core, whereby a strong, secure and rigid connection is effected between said core and said handle and a strong and substantial core is provided to lend strength to the snow removing device.

2. A snow removing device as defined in claim 1 wherein said foam material of said sheath is a mini-cell, cross-linked, closed cell polyethylene material.

3. A snow removing device as defined in claim 1 wherein said core is constructed of wood.

4. A snow removing device as defined in claim 1 wherein said outer length dimension is approximately 19 inches.

5. A snow removing device as defined in claim 1 wherein said outer height dimension is approximately 6 inches.

6. A snow removing device as defined in claim 1 wherein said outer thickness dimension is approximately 2 inches.

7. A snow removing device as defined in claim 1 wherein said outer length dimension is approximately 1.6 times said inner length dimension.

8. A snow removing device as defined in claim 1 wherein said outer height dimension is approximately 2.4 times said inner height dimension.

9. A snow removing device as defined in claim 1 wherein said outer thickness dimension is approximately 2 times said inner thickness dimension.

10. A snow removing device as defined in claim 1, wherein said core has a flat, planar configuration and wherein said handle is straight and extends perpendicularly from the plane of said core.

11. A snow removing device as defined in claim 1, wherein said outer thickness dimension is in the range of 1.5 to 2.5 inches and wherein said head has a cross-section, taken in a plane perpendicular to said handle, which cross-section is in the shape of a rectangle with an outer long side and an outer short side, said head having an outer length dimension taken in a direction along said outer long side, which outer length dimension is in the range of 12 to 30 inches, an outer height dimension taken in a direction along said short side, which outer height dimension is in the range of 3 to 12 inches;

said core having inner length and inner height dimensions taken in directions generally parallel to said outer length and outer height dimensions, respectively, said outer length dimension being between 1.25 to 2 times the inner length dimension, said outer height dimension being between 1.5 and 3.5 times the inner height dimension;

whereby a large snow removal area is provided in a lightweight and strong device which will not scratch or mar an automobile finish, and whereby the cellular polyethylene sheath constitutes a relatively large portion of said head.

12. A manual snow removing device for automobiles comprising:

a head having front and rear sides;

said head including a core and a sheath, said sheath surrounding and completely encapsulating said core, said sheath having front and rear sides defining, respectively, said front and rear sides of said head;

said sheath constructed of a mini-cell, cross-linked, closed-cell, expanded polyethylene foam material for permitting said head to glide over an automobile finish without marring or scratching the same and for ensuring that said head is soft and resilient under freezing conditions, said core being a material different from that of said sheath;

an elongated handle coupled with said head by attachment to said core, said handle extending through one side of said sheath.

* * * * *